(12) United States Patent
Olshansky et al.

(10) Patent No.: US 7,224,837 B2
(45) Date of Patent: May 29, 2007

(54) DIGITAL VIDEO BROADCASTING

(75) Inventors: Avigdor Olshansky, Ramat Hasharon (IL); Yoram Caspi, Tel Aviv (IL)

(73) Assignee: Screenpeaks Ltd. (IL)

( * ) Notice: Subject to any disclaimer, the term of this patent is extended or adjusted under 35 U.S.C. 154(b) by 920 days.

(21) Appl. No.: 09/793,226

(22) Filed: Feb. 26, 2001

(65) Prior Publication Data

US 2002/0049985 A1 Apr. 25, 2002

Related U.S. Application Data

(60) Provisional application No. 60/239,452, filed on Oct. 11, 2000.

(51) Int. Cl.
*G06K 9/36* (2006.01)
*G06K 9/46* (2006.01)

(52) U.S. Cl. .................. 382/232; 348/423.1; 370/486; 370/535; 375/240.28; 386/98; 386/112; 725/71; 725/98; 725/131

(58) Field of Classification Search ............ 348/423.1, 348/426.1, 469; 370/254, 394, 397, 399, 370/409, 428, 431, 444, 478, 486, 535, 537, 370/538; 375/240.12, 240.2, 240.25, 240.29, 375/240.01, 240.28; 382/232; 725/87, 90, 725/95, 114, 116, 120, 138–139, 71, 98, 131; 386/68, 83, 98, 112; 709/236

See application file for complete search history.

(56) References Cited

U.S. PATENT DOCUMENTS 4,868,653 A 9/1989 Golin et al.
5,469,431 A * 11/1995 Wendorf et al. ............ 370/254

(Continued)

FOREIGN PATENT DOCUMENTS

EP 0915623 5/1999

(Continued)

OTHER PUBLICATIONS

"Information Technology—Generic coding of moving pictures and associated audio information: System", *International Standard*, ISO/IEC 13818-1:1996(E) (Apr. 15, 1996).

(Continued)

*Primary Examiner*—Gregory Desire
(74) *Attorney, Agent, or Firm*—Fitch, Even, Tabin & Flannery

(57) ABSTRACT

A method is provided for transmitting a plurality of informational video programs over a single digital transport stream to a plurality of receivers, wherein the receivers are operative to select from the transport stream data identified with any given program and to decode the identified data into a displayable video signal. The method consists of storing a plurality of the informational video programs, scheduling them along corresponding simultaneous time lines, rendering each program and encoding, according to standards, into a video stream, multiplexing the video streams in an interleaved manner, and formatting them to become the transport stream, wherein any of the operations of scheduling, rendering encoding and multiplexing are such that images, obtained by decoding transmitted data identified with any of the programs and displaying the resultant video signal, are essentially similar to those obtainable by rendering and encoding the programs separately, transmitting the respective encoded program alone over a similar transmission stream, decoding the transmitted data and displaying the resultant video signal.

34 Claims, 4 Drawing Sheets

U.S. PATENT DOCUMENTS

| | | | |
|---|---|---|---|
| 5,715,176 A * | 2/1998 | Mobini | 709/236 |
| 5,787,089 A | 7/1998 | Casey et al. | |
| 5,852,609 A | 12/1998 | Adams, III et al. | |
| 5,856,973 A | 1/1999 | Thompson | |
| 5,856,975 A | 1/1999 | Rostoker et al. | |
| 5,898,695 A | 4/1999 | Fujii et al. | |
| 5,953,691 A | 9/1999 | Mills | |
| 5,966,385 A | 10/1999 | Fujii et al. | |
| 5,999,216 A | 12/1999 | Kaars | |
| 6,005,620 A | 12/1999 | Yang et al. | |
| 6,041,056 A * | 3/2000 | Bigham et al. | 370/395.64 |
| 6,044,396 A | 3/2000 | Adams | |
| 6,084,910 A | 7/2000 | Stanger et al. | |
| 6,088,355 A | 7/2000 | Mills et al. | |
| 6,122,316 A * | 9/2000 | Varanasi et al. | 375/240.12 |
| 6,324,667 B1 * | 11/2001 | Sugaya | 714/746 |
| 6,393,200 B1 * | 5/2002 | Van Den Enden | 386/68 |
| 6,404,818 B1 * | 6/2002 | Obikane | 375/240.28 |
| 6,414,720 B1 * | 7/2002 | Tsukidate et al. | 348/469 |
| 6,442,328 B1 * | 8/2002 | Elliott et al. | 386/46 |
| 6,467,093 B1 * | 10/2002 | Inoue et al. | 725/151 |
| 6,504,871 B1 * | 1/2003 | Varanasi et al. | 375/240.2 |
| 6,556,594 B2 * | 4/2003 | Uchide | 370/537 |
| 6,594,826 B1 * | 7/2003 | Rao et al. | 725/95 |
| 6,609,251 B1 * | 8/2003 | Yoneda | 725/71 |
| 6,671,290 B1 * | 12/2003 | Murayama et al. | 370/486 |
| 6,683,986 B1 * | 1/2004 | Westerman | 382/232 |
| 6,738,983 B1 * | 5/2004 | Rao et al. | 725/120 |
| 6,751,402 B1 * | 6/2004 | Elliott et al. | 386/83 |
| 6,754,241 B1 * | 6/2004 | Krishnamurthy et al. | 370/537 |
| 6,785,338 B1 * | 8/2004 | Reitmeier et al. | 375/240.29 |
| 6,813,270 B1 * | 11/2004 | Oz et al. | 370/394 |
| 6,873,629 B2 * | 3/2005 | Morris | 370/535 |
| 7,146,094 B1 | 12/2006 | Boyle | 386/95 |
| 2004/0261123 A1 * | 12/2004 | Yamada et al. | 725/131 |

FOREIGN PATENT DOCUMENTS

| | | |
|---|---|---|
| EP | 1414246 A2 * | 4/2004 |
| WO | WO 99/51030 | 10/1999 |

OTHER PUBLICATIONS

"Information Technology—Generic coding of moving pictures and associated audio information: Video", *International Standard*, ISO/IEC 13818-2:1996(E) (May 15, 1996).

Atzori, L. et al. "Multimedia Information Broadcasting Using Digital TV Channels", *IEEE Transactions on Broadcasting*, vol. 43, No. 4, Dec. 1997.

International Search Report for PCT/IL 01/00940 of Apr. 3, 2002.

* cited by examiner

DIGITAL VIDEO BROADCASTING

This application claims benefit of U.S. provisional application No. 60/239,452, filed Oct. 11, 2000.

FIELD OF THE INVENTION

This invention relates to Digital Video Broadcasting (DVB) and, in particular, to the efficient broadcasting of informational channels over a DVB system.

BACKGROUND OF THE INVENTION

Digital Video Broadcasting systems have been defined in terms of standards for a variety of broadcasting media, such as cable and direct satellite broadcasting, and for most stages of the broadcasting chain, from contents origination to decoding at the viewer's television set. Such systems are now in the early stages of adoption.

Typically, a DVB system, such as that using cables for signal distribution, broadcasts a plurality of contents channels (also referred to hereunder as channels) and consists of a head-end, the cable distribution system and a decoder (such as in a set-top box) associated with a television receiver at each subscriber location. At the head-end, illustrated by the exemplary block diagram of FIG. 1 (excluding the shaded area), the contents for the various channels are supplied from respective video tape players and from incoming trunk transmission paths, such as terrestrial or satellite links. The contents of each such channel is digitally encoded, if it is not already input in the proper code and the resultant digital signals from a number of channels are routed to, and combined, within a Multiplexer (MUX), into a single digital transmission stream, called Transport Stream (TS), which, after modulating a certain carrier frequency is fed into the cable system. Usually, a plurality of carriers are broadcast over the system, each one carrying one TS that has been produced within a respective MUX from a corresponding group of channels. Each decoder receives the transmission streams and, according to the channel currently selected by the subscriber, demodulates the appropriate carrier, selects from the corresponding TS the signal bits corresponding to that channel and decodes them—to produce an appropriate video signal for inputting into the television receiver, where the signal is displayed as images on the screen, in the usual way. Obviously, the video signal may also be directed to other devices, such as a computer, a video recorder or a local transmission system.

According to current DVB standards, as published, for example, in ETSI ETR 154, the encoding of each channel is according to MPEG-2 standards, which are well known in the art. Usually each video channel is encoded into a constant stream of between 2 and 6 megabits per second (Mb/s)—depending on the quality assigned to the particular channel. It may thus be said that each channel has a transmission rate capacity of 2–6 Mb/s. Each combined TS (modulating one carrier) has a rate of approximately 38 Mb/s. It thus carries between six and nineteen channels. With, say, 40 carriers, which is typical for a cable system, the total number of channels possible is thus between 240 high-quality channels and over 700 lower-quality channels.

In spite of this seemingly large number of channels available in a system, it is likely that they may not be enough for the needs of broadcasters and subscribers, so that there may be a high value attached to each available channel. Much of the source material intended for such channels has the characteristics of a full video signal, that is—it represents complex images with relatively large amount of motion, such as regular movies, advertisement video and other camera-captured moving scenes. Such material is considered to have "rich" information contents and therefore requires the allocated channel bit rate (e.g. 2–6 Mb/s). On the other hand, there is a large class of video source material that is relatively "lean" in information contents. This class mainly includes "informational" type of programs, such as government—and civic announcements, train schedules, weather forecasts, news and simple advertisements—all of which is characterized by being usually presentable in terms of text, simple graphics and occasional small insets of video clips; the text and graphics may include some animation, which involves simple motion. Clearly, such material, when digitally encoded, e.g. according to any MPEG standard, requires a much lower rate than the minimum of 2 Mb/s of the standard channel in a DVB system. Thus, allocating a complete standard channel to each source of such program material, within a DVB system, is wasteful of system resources and may be uneconomical; that is, the charges levied for each channel by the system operator may be too high for the utility value of broadcasting such sources.

While it is conceivable that the standards of DVB systems may be extended to accommodate channels of ever lower rates, so as to efficiently accommodate "lean" sources of this type, such a course may be rather impractical, because it would greatly increase the complexity of the head-end equipment—especially of the multiplexer—thus greatly increasing its cost, which is high even under present standards (typically about $200,000). Moreover, as will be shown in the discussion of the present invention, such informational video material may be compressed to even lower average bit rates than any predefined rate within such extended-standards DVB systems, so that the efficiency achievable with such an extended-standards system may not be optimal.

There is thus a need, and it would be highly desirable, to have a method, and preferably also an apparatus, for efficiently and economically encoding informational video material and broadcasting it within a currently standard DVB system. The role of such apparatus in a head-end of a DVB system is shown, for example, schematically (marked by a shaded area) in FIG. 1. Here it is seen to be connected so that it receives program materials from various sources over a digital network (which may include the Internet) and to feed a corresponding transport stream, which carries the various materials, as a single channel into the router of the head-end.

It is, moreover, highly desirable that as many programs as possible be thus encodable into a single channel without exceeding its data transmission capacity and without introducing noticeable distortions or other deleterious effects in the received images.

It is, furthermore, highly desirable that the programs from the various sources be individually selectable by the user and that his set-top box be able to decode them as it would any conventional program material, without the need for special modification of the box. In other words, it is desirable that the various programs be treated by external agents as proper channels; in the present context they will be referred to as Micro-channels, or Virtual information channels (VIC). Accordingly, the desired equipment will be referred to as VIC Server.

SUMMARY OF THE INVENTION

The field of the invention is Digital Video Broadcasting (DVB). The invention provides a method and means for converting informational graphic data, intended for television display, coming as separate programs from a plurality of sources, into a single multiplexed digitally-encoded (e.g. per MPEG2 standard) data stream, equivalent to that of a standard digital video channel, to be input to the head-end of a digital video distribution system, particularly—a digital video broadcast (DVB) system, such as one based on a cable network. Such informational graphic data is typified by having generally "lean" information content, in contrast to normal video data, which generally has complex and relatively fast changing pictorial contents. It is usually intended to convey relatively simple messages—to provide practical information or simple advertisements to the subscribers. The DVB system may use any distribution medium, such as a cable infrastructure, terrestrial digital television transmission or a Direct satellite broadcasting system. It usually broadcasts a plurality of video programs, each treated as a video channel and encoded into a constant-rate transmission stream (usually of between 2 and 6 megabits per second) A plurality of such transmission streams are generally multiplexed into a combined (multi-program) transmission stream, whereby each subscriber of the system may choose any program (also referred to as channel) and the set-top decoder of his television receiver will select and decode the corresponding data from the combined transmission stream.

In the context of the invention, the graphic data from the plurality of sources, encoded and multiplexed into a single transmission stream, are treated as corresponding programs, also referred to as virtual information channels (VICs). According to the invention, the multiplexed transmission stream has the format and symbol rate of a standard channel of the DVB system, so that it can be transmitted as such—either alone or, preferably, multiplexed with other channels being broadcast by the head-end equipment. Furthermore, each virtual channel is selectable by a subscriber of the DVB system and decodable by the standard decoder (e.g. in the set-top) in the same manner as a regular video channel, without modifications thereto.

As a result of the method of the invention, the encoding of all VICs is highly efficient, so that a large number of VICs can be combined into a single channel with minimal noticeable image distortions. The meaning of this is that the method and apparatus of the invention enable a plurality of informational video programs to be transmitted as a single digital video transport stream, of a given rate, so that the resultant displayed video images (including their time dimension) of any program will appear to normal users essentially similarly to those that would be obtained by encoding the respective program according to conventional methods and transmitting it alone over a similar transport stream. A complementary aspect of this meaning is that if the same plurality of programs were encoded and multiplexed into a similar transport stream by conventional methods, the resultant video images for at least some of the programs would be highly distorted, spatially and temporally—reflecting considerable loss of data.

The apparatus according to the invention allows the data received from the various sources to come in any of a variety of formats, such as various page-description languages and image formats (e.g. BMP, SWF, PowerPoint, HTML), possibly compressed according to some standard (e.g. JPEG, MPEG), whereby any one source may send a variety of such formats within a single program.

According to one aspect of the present invention there is provided a so-called VIC Server, ancillary to the head end of a DVB system (which includes a standard multiplexer—MUX), that has the data from the various graphic video sources as its inputs and that outputs an MPEG-2 transport stream, as a standard video channel input into the MUX. At the heart of the VIC Server is a processing module (PM) system, which is designed and programmed to carry out any of the methods of the invention.

The invented methods are designed to take advantage of some characteristics typical for the various source data types so as to effect a high degree of data compression, as well as of processing efficiency.

For example, the simplicity of most of the graphics, as well as the relatively little motion over most of the area of any scene, inherently enable a is high degree of compression in the MPEG encoding process. Such compression is achieved both in the encoding of fill raster frames, such as Intraframes (I-frames), and in determining a greater length than usual for groups of frames (also known as groups of pictures) following any I-frame.

Moreover, because of this simplicity of the graphics, the resolution of the image may be decimated to one half or one quarter before encoding, without causing visible artifacts. Also, since the graphics from most of the sources are computer generated, their direct rendering avoids quantization noise, thus further increasing the potential compression. Because of the direct rendering there also is pre-knowledge of motion, from which motion vectors, such as used for MPEG encoding, can be calculated directly—obviating the computationally heavy extraction of such vectors from sequential images and even the need to fully render all frames other than I-frames.

Generally also most programs with such material are insensitive to exact timing, particularly of scene changes—a fact of which the method of the invention is designed to take advantage by dynamically introducing into the MPEG streams of some of the programs slight shifts, so that I-frames in the various parallel MPEG streams (which, by their nature, require large numbers of bits) become staggered—thus evening out the required overall instantaneous bit rate, so as to more closely match the actual channel transmission rate at any instant.

In addition, there is, in many cases, great flexibility in scheduling various items within any program, so that items of relatively heavy information contents may be dynamically scheduled to fall within periods of low demand by other programs.

The functional principles that guide the processing according to the present invention, with exemplary reference to prevalent standards of digitally encoding video programs, thus include any of:

1. MPEG-encoding images of each program at maximal compression, consistent with acceptable image quality and subject to the ultimate limitation by the available overall channel rate, whereby, for most types of graphics the image resolution is set at one half or one quarter of the original video—to be displayed at full resolution after decoding;

2. Dynamically controlling the compression parameters during the encoding of each program, according to predefined quality priorities, so as to keep the rate of the combined data stream within the specified channel rate;

3. During the MPEG-encoding of some of the rendered images, controlling the exact timing of each key frame (I-frame) so as to stagger information-heavy key frames of the various VICs, thus keeping the instantaneous bit rate of the subsequently resultant combined data stream as even as possible;

4. During the MPEG-encoding of some of the rendered images, transferring some data from information-heavy I-frames to proximate P-frames, so as to keep all of them within the allowed instantaneous bit rate.

5. Staggering, and otherwise controlling, the presentation timing of various elements for some programs, so that those of high average rates become mutually interleaved and, further, coincide with periods of low average rates in other programs.

In addition, some pre-processing techniques, such as anti-aliasing, are used to further increase compression and reduce encoding time.

According to a preferred embodiment of the invention, the PM includes the following functions:

1. Obtaining material for each program from the respective sources, in the form of scripts, containing image data and presentation schedules.

2. Scheduling the various programs to run concurrently.

3. Rendering and encoding scheduled material of the various programs into corresponding encoded video streams, the rendering being adaptable to a wide range of input formats and the encoding being preferably according to MPEG or similar standards.

4. Multiplexing data streams of all currently scheduled programs, in a data-interleaving manner, into a single composite transport stream and formatting the latter as a standard DVB channel, preferably according to MPEG2 or similar standards (to be subsequently multiplexed with other standard transport streams).

5. Organizing and controlling all above operations so as to cause the resultant composite transport stream to have a rate that at no time exceeds the specified capacity of the channel. This function particularly includes continuously analyzing the average data density of each program, and, if necessary, ordering re-encoding of certain programs (under different parameters) to reduce data density or to shift I-frames or to change the length of a group of frames. Additionally, if necessary, re-scheduling of program elements and/or smoothing of rendered images are ordered, if further necessary to achieve the desired rate. The function also includes micro-scheduling the various programs in the process of multiplexing, i.e. selecting appropriate data segments to be consecutively input to the multiplexer so as to keep the effective instantaneous data rates of all programs within the composite data stream balanced.

The term "instantaneous data rate" throughout the above exposition should be construed as conveying the meaning emerging from the following explanation: The video signal produced in any receiver is structured by periodic frames (usually at the rate of 25 or 30 frames per second). The signal of each frame is generated by the decoder from received data; generally the encoded data is structured by frames, usually corresponding to the video frames. Digital video transmission standards provide a certain maximum allowable period of time, usually termed VBV delay, over which the decoder must wait to receive all the data necessary to begin generating any frame. For a standard digital video channel, this time period is generally long enough to receive the complete data of an I-frame under the worst case. Under the conditions addressed by the present invention, however, whereby data of several programs is transmitted over the transmission stream simultaneously, it would often be the case that, without applying the methods of the invention, several I-frames (or other frames with large amount of encoded data) occur in close proximity. Since the overall data transmission rate is constant, this would cause the data intended for a particular frame, corresponding to at least some of the programs, to arrive at the decoder outside the allowed period, thus causing disruption in the video signal and in the ensuing displayed image. The spacing of data intended for two consecutive frames of any thus affected program will, in such a case, be greater than desired—which is equivalent to saying that the corresponding instantaneous data rate is lower than desired.

It is self evident that, in order to satisfy the condition of the maximum allowable delay, a minimal requirement is that the sum of the average data rates of all programs being transmitted not exceed the rate of the transmission stream. This is one goal of the method of the present invention. Beyond this, however, it is required that the effective instantaneous rates of data associated with any and each program while interleaved in the stream with data associated with other programs not fall below an allowable value—equivalent to an interframe delay greater than that allowable by the standards. It is also this requirement that the method of the present invention aims to fulfil.

The PM is generally and preferably implemented as software on a suitable high-power general-purpose computer, with connection to the sources through a standard data network, such as the Internet, and with an interface to the standard head-end equipment. For high performance, some functions may be implemented on special hardware (such as acceleration components in the computer or parallel processors). The software may be designed according to any architecture, though preferably with modules as described herein.

The bandwidth (i.e. transmission-rate) of the single channel of the DVB system, into which the output of the invented system is directed, may be chosen from among a number of values allowed by the DVB standards (e.g. between 2 and 6 Mb/s). If, as may occur in some cases, the number of programs is too large to be encoded and multiplexed into a single channel of the widest band (highest rate) available, the invented apparatus may be configured to output two or more composite data streams, each input as a separate standard channel into the head-end of the DVB system.

While the above discussion referred primarily to a multichannel DVB systems as being the target application, and to current encoding- and transmitting standards customary in such systems, it should be understood that the present invention is applicable to many other types of digital video transmission systems and using other standards of encoding and transmission—all with minor modifications that should be obvious to a practitioner of the art.

There is thus provided, according to the invention, a method for transmitting a plurality of informational video programs over a single digital transport stream to a plurality of receivers, the transport stream having any given rate of transmission and the receivers being operative to select from the transport stream data identified with any given program and to decode the identified data into a displayable video signal, structured as periodic frames, the method comprising:

i) storing a plurality of the informational video programs;

ii) scheduling a plurality of the stored programs along corresponding simultaneous time lines;

iii) rendering each of the scheduled programs to obtain corresponding raster-based image representation;

iv) encoding the raster-based representation of each rendered program according to standards acceptable to the receivers, to obtain a corresponding encoded video stream, consisting of successive data segments, each segment being associated with a respective frame of any video signal resulting from decoding it;

multiplexing the encoded video streams corresponding to all scheduled programs, in an interleaved manner, to form a combined stream; and v) formatting the combined stream to become the transport stream, wherein all the data segments are identified with their respective programs;

wherein any of the operations of scheduling, rendering encoding and multiplexing are such that images, obtained by decoding transmitted data identified with any of the programs and displaying the resultant video signal, are essentially similar to those obtainable by rendering and encoding the programs separately, transmitting the respective encoded program alone over a similar transmission stream, decoding the transmitted data and displaying the resultant video signal.

There is also provided, according to the invention, Apparatus connectable to a digital video broadcasting (DVB) system, having a plurality of receivers, for feeding thereto a transport stream that carries data representing a plurality of informational video programs, the transport stream having any given transmission rate and the receivers being operative to select from the transport stream data identified with any given program and to decode the identified data into a corresponding displayable video signal, structured as periodic frames, the apparatus comprising:

storage for storing a plurality of informational video programs;

a scheduler for scheduling a plurality of the stored programs along corresponding simultaneous time lines;

a renderer for rendering each of the scheduled programs to obtain a corresponding image representation;

an encoder for encoding the image representation into a corresponding encoded video stream, having a format decodable by any of the receivers and consisting of successive data segments, each segment being associated with a respective frame of any video signal resulting from decoding it;

a multiplexer and re-formatter for multiplexing a plurality of the encoded video streams, in an interleaved manner, and for formatting them into the transport stream; and an organizer operative to control the operation of the scheduler, the renderer the encoder and the multiplexer so that images, obtained by decoding transmitted data identified with any of the programs and displaying the resultant video signal, are essentially similar to those obtainable by rendering and encoding the programs separately, transmitting the respective encoded program alone over a similar transmission stream, decoding the transmitted data and displaying the resultant video signal.

According to further features of the invention, each data segment within the transport stream reaches any receiver, set to select and decode it, within a given time period prior to the start of the associated frame in the resultant video signal; the acceptable standards include structuring the encoded video stream by groups of frames and the encoding includes determining the beginning and end of any group of frames, whereby the lengths of the groups may vary along the stream.

According to additional features of the invention the method further comprises—adjusting any parameters governing the encoding of any of the programs for any adjusting portion of the respective encoded video stream so as to reduce the amount of data in the portion;

continuously calculating the sequence in which data segments from the encoded video streams of the various programs are to be multiplexed into the combined stream and the lengths of such segments; and repeating step (iv) for any portion of any program with changed encoding parameters;

repeating steps (ii) and (iii) for any program or portion thereof, whereby its schedule is changed from the previous one.

According to other features of the invention, the schedule of any program or portion thereof along its respective time line, resulting from the scheduling in step (ii), may deviate from that prescribed by the respective scheduling data; and the transport stream, being an informational transport stream, is carried by a digital video broadcasting (DVB) system along with a plurality of other transport streams and the receivers are operative to select and decode data in any of the other transport streams in the same manner as they do with respect to the informational transport stream.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE INVENTION

The method and apparatus of the present invention will be described hereunder in the context of a typical head-end of a digital video cable system. This is done by way of illustrative example and not to limit the scope of the invention. Application of the invention to other digital video broadcast systems should be possible with minor modifications, obvious to practitioners of the art.

Figure 1:
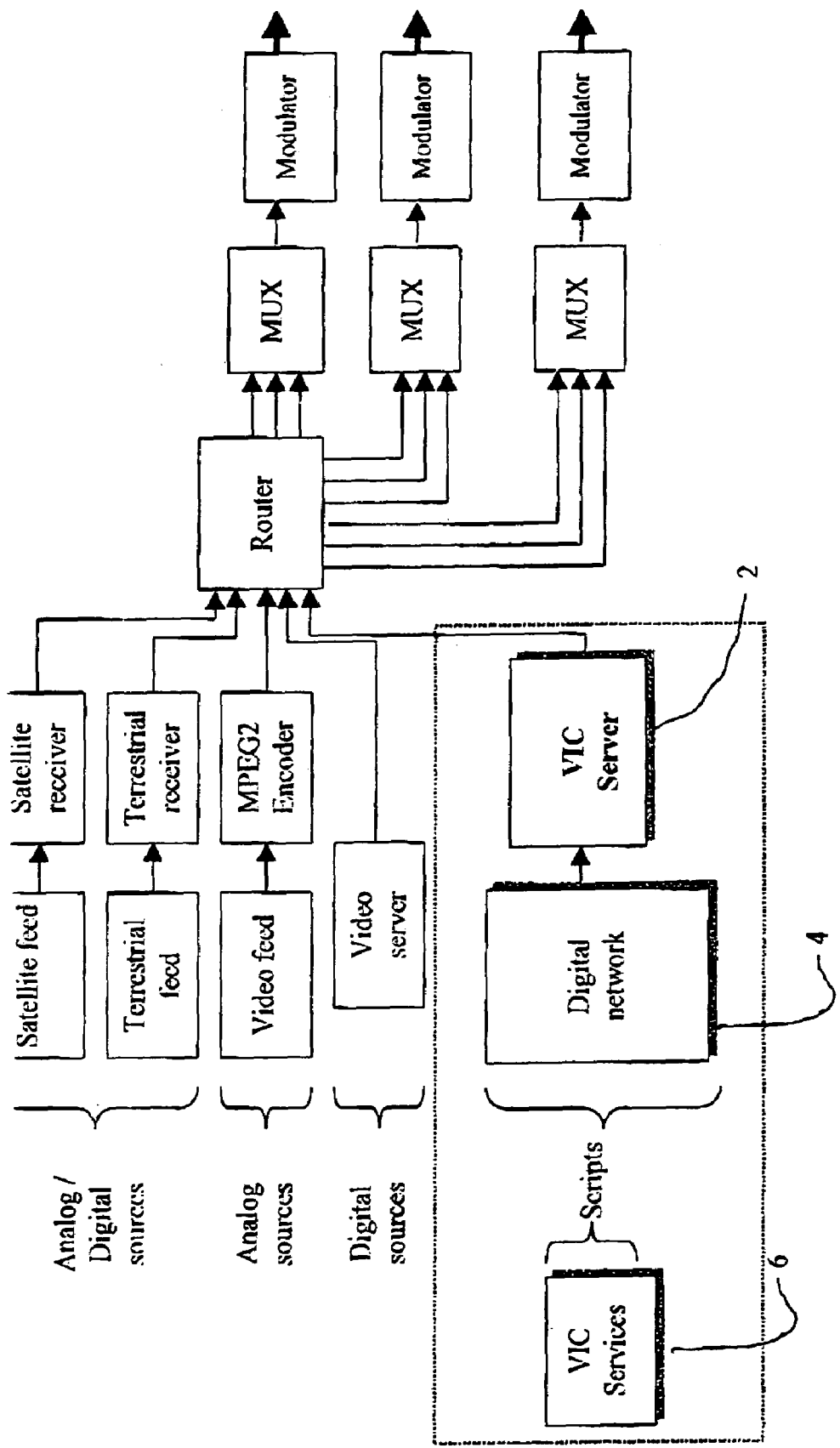
FIG. 1 is a schematic block diagram of a typical head-end of a DVB system, with the invented apparatus connected thereto.
Figure 2:
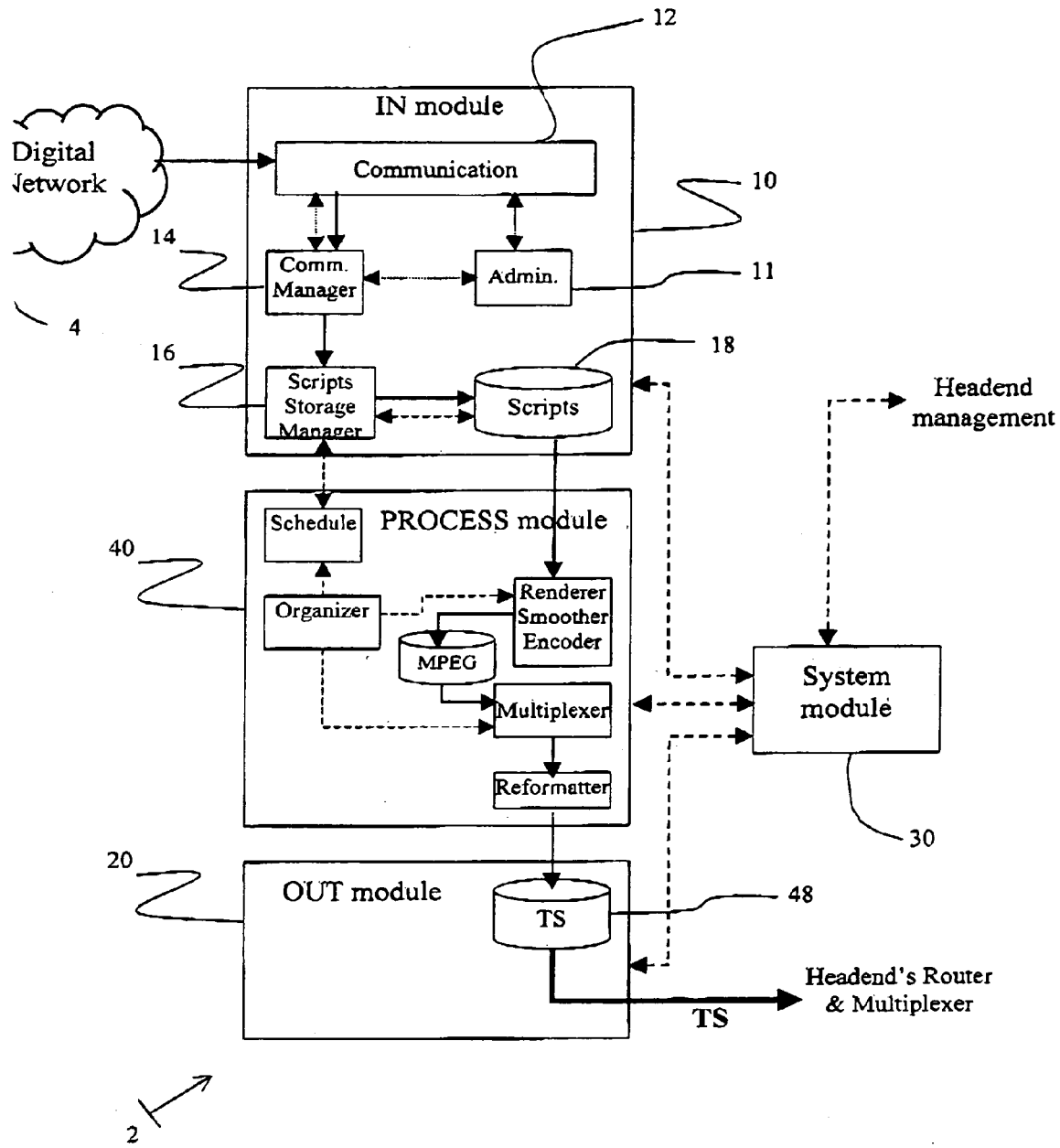
FIG. 2 is a top-level block diagram of the invented apparatus.

FIG. 1 shows schematically a VIC Server 2 (within the shaded area), which embodies the present invention, connected to the router of the exemplary head-end of a digital cable system, to input a transport stream thereto, alongside conventional inputs as discussed in the Background section above. FIG. 2 shows an overall block diagram of a preferred embodiment of VIC Server 2 according to the present invention. It consists largely of an Input module 10, a Process module (PM) 40, an Output module 20 and a System Controller 30.

Input module 10 of VIC Server 2 communicates with all sources of programs through a digital network 4, which may be of any conventional type, including the Internet. Each program typically consists of a series of scripts, each script containing graphic data, also referred to as image data, which define informational images and associated sound or sequences of such images, and instructions, to be referred to as schedule, pertaining to the scheduling, priorities and constraints for the graphic data or portions thereof. Also included with each program is a master schedule (also referred to as meta-schedule), which provides an overall control of the scheduling of all scripts in the program. The scripts may be formatted in any convenient format, which is preferably dictated by the VIC Server. Optionally and preferably, the VIC Server sends to client terminals that serve as program sources a suitable software package, termed VIC Services 6, to aid in generating the scripts. The graphic data in the scripts may come in any conventional format or image-related standard, such as JPEG, BMP, SWF, etc.

Input module 10 performs autonomously, under control of an Administration module 11. A communication Manager 14 inputs program scripts from network 4 through a communication module 12. A Scripts Storage Manager 16 manages the scripts and stores them in a Scripts Storage 18. It also reports about them to Process module 40 and to System Controller 30. All scripts yet to be processed for broadcasting remain stored in Scripts storage unit 18, where they are ready for retrieval by the PM.

Process module (PM) 40, which is at the heart of the Server, functions to convert scripts of all current programs into a composite digital transport stream (TS), having any given rate of transmission; preferably, the rate is that of any standard digital video channel. It is thus ready to be input to the head-end, where it will be multiplexed with other channels, as shown in FIG. 1. The PM is described in detail further on.

Optional Output module 20 serves to interface with the head-end and may also serve to merge into the TS data obtained via paths other than the PM—for example, real-time digital video data.

System Controller 30 serves to provide overall control of the Server and its data paths and communicates with the head-end for exchange of status data and parameters and for managerial tasks, such as accounting and reporting.

It is noted that if the available rate of a single TS does not suffice for all the programs normally available at the Input module, the system may be configured so that two or more TSs are output to the head-end. Such configuration may, for example, have two or more PMs being served from a common Input module, each outputting a respective TS, or alternatively, it could consist of a plurality of complete VIC Servers, each outputting a respective TS, or, as another alternative, The PM itself may be modified to output a plurality of TSs.

Figure 3:
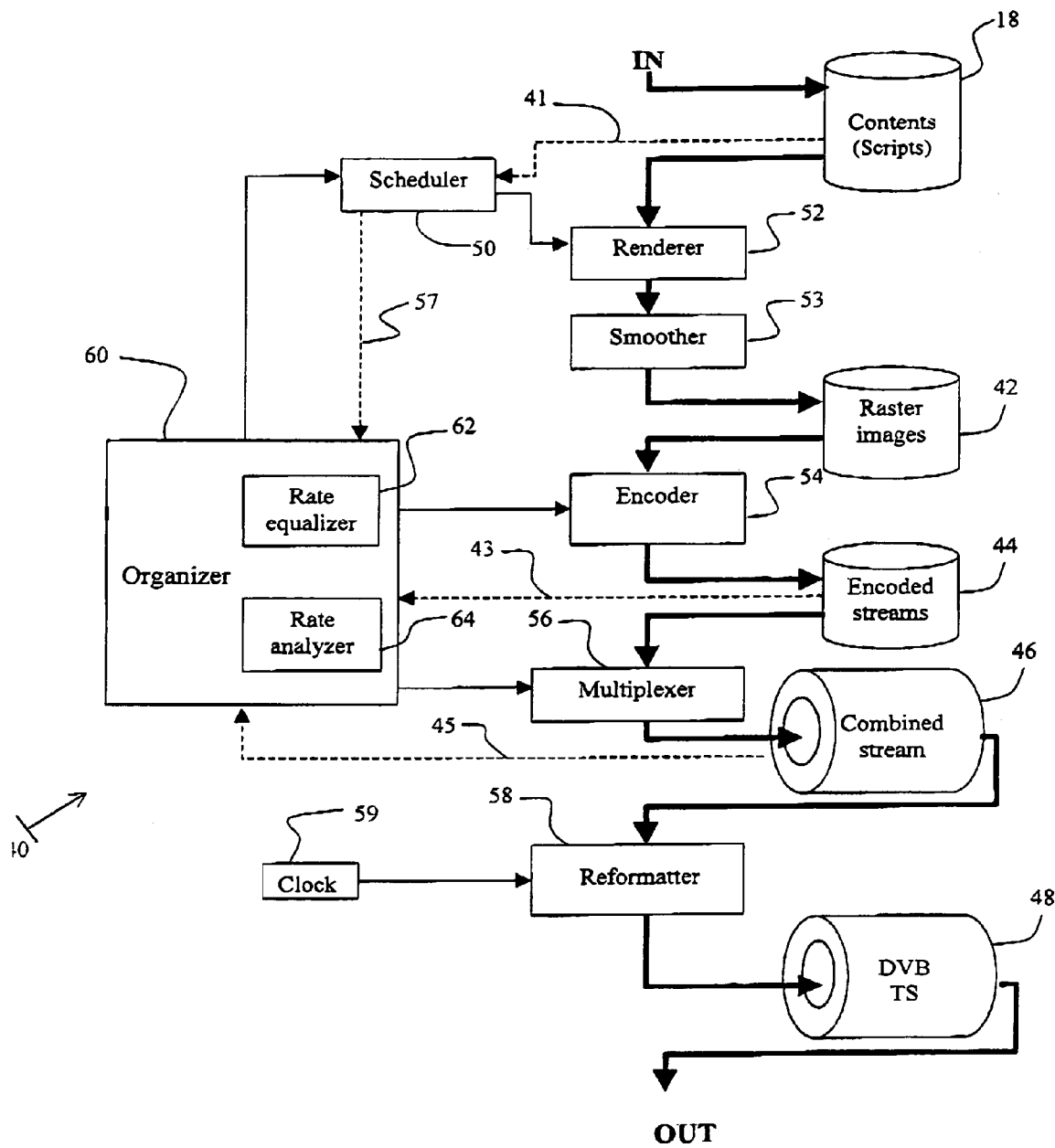
FIG. 3 is a schematic block diagram of a preferred embodiment of the process module within the invented apparatus.

Process module 40 will now be described, with reference to FIG. 3, which is a schematic block diagram of this central section of the VIC Server. First, the main data path will be described and afterwards, the control paths and operation of the processor will be explained. Data paths are shown in FIG. 3 by double-line arrows.

Program scripts received by the Input module and generally scheduled to be broadcast are stored in Scripts Storage 18. At appropriate times, a script from any one program, or a segment of a script, is fed to a Renderer 52, which accordingly renders in raster format one or more whole images or new portions of an existing image, such as animation elements or successive frames of a movie window. The Renderer is preferably aided by drivers specialized to specific image description formats in which the graphic data in the scripts may be provided. In order to minimize the amount of data subsequently output by the Encoder (to be described below) and/or to minimize artifacts in the eventually displayed image, the Renderer is preferably directed, at times, to apply certain processing on the raster image, such as halving the number of pixels along each image axis and de-interlacing.

At times, a raster-format image output by Renderer 52 is preferably processed by a Smoother module 53 in order to further decrease the amount of data output by the Encoder. Such processing may include softening sharp edges, anti-aliasing diagonal edges and corners, cleaning out noise-like patterns and small spots, and other techniques known in the art. The raster-format images output by Renderer 52 or Smoother 53 are stored in a Raster Storage 42, together with additional data, such as pertaining to motion and sound.

As needed, raster images or portions thereof, with the additional data, are retrieved from Raster Storage 42 and encoded by an Encoder 54 into a compact coded representation. Preferably this representation is according to the well known MPEG standards. Typically, such representation consists of groups of frames (also known as group of pictures, or GOP), corresponding to video frames to be displayed, and auxiliary data such as motion vectors. Generally the first frame in each group, referred to in MPEG standards as an I-frame, conveys a complete raster image, encoded in a compact manner. The other frames of a group, known in MPEG standards as P-frames and B-frames, convey image difference data. As is known, these other frames are eventually restored to full images, upon decoding, by adding the respective motion vectors and image difference data to the restored key frames. It is noted that under usual practice, GOPs have constant given lengths, e.g. 16 frames each, though this is not proscribed by the standards. It is a feature of the present invention that Encoder 54 (or any other component carrying out encoding according to the invention) be capable of forming GOPs of varying lengths and that key frames (e.g. I-frames) may occur at any chosen place along the resultant data stream. It is a further feature of the present invention that any key frame does not necessarily convey the entire data of the respective raster image and that the rest of such data be conveyable by any of the other frames in the respective group; proper marking of such data enables a decoder to return it to its proper frame. Both features are used to advantage in that the first enables shifting peaks of data in any one stream (corresponding to one program) with respect to possible peaks in other data streams, so as to even out the data flow in the resulting TS, while the second-mentioned feature may help to even out the data flow within any one stream. The encoded data output by the Encoder are stored in a Encoded-streams Storage 44.

Encoded-streams Storage 44 thus stores data streams corresponding to all currently scheduled programs. These are read out in proper sequence, a data segment at a time from all relevant streams, into a Multiplexer 56, which combines them in an interleaved manner, to be output as a single combined data stream. During the process, each segment of data is tagged—to identify it with the program (i.e. virtual channel) to which it corresponds. The combined data stream, output from Multiplexer 56, is fed into a dedicated pipeline buffer storage 46, termed Combined stream Storage. Storing and retrieving data in this buffer occurs in a first-in-first-out (FIFO) manner. It is noted that, in the present context, the term "segment" does not refer to any formal data structure, but rather to any small portion of data, of any length, as determined by the logic in the Organizer (as explained below). Preferably, such segments have lengths that correspond to an integral number of Transmission stream packets.

Data regularly output from Combined stream Storage 46 are preferably fed through Re-formatter 58 to another, final, FIFO pipeline storage 48, termed DVB-TS Storage. Re-formatter 58 reformats the data stream so as to conform with the standards of the digital broadcast system, e.g. MPEG2. This includes packetizing the data and converting the tags of the data segments to those of the standard packets. It is noted that these tags are subsequently recognized by set-top decoders, which can accordingly select packets corresponding to any one program (as chosen by the user), pick them out of the transport stream and assemble them into a corresponding decodable data stream, which thus becomes a virtual channel (treated much in the same way as a regular video channel). The most likely standards of the broadcast system are ones based on the well known MPEG2 standard. Accordingly, the transport stream output by the VIC Server will also be referred to as an MPEG2 stream, but it should be understood that the present invention is applicable to any system, using any TS standards. Several specific versions of MPEG2 are in practice in various regions of the world, to all of which the VIC Server of the present invention is adaptable. It should be appreciated that Multiplexer 56 and Re-formatter 58 may be embodied as a single module, possibly also without Combined stream Storage 46 intervening between them.

Operation of Process module 40 of the VIC Server and of the method embodied in it, according to the present invention, will now be explained, again in terms of the preferred embodiment represented by FIG. 3. In this drawing, control paths are marked by solid single-line arrows and information paths—by dashed-line arrows. Most of the operation is controlled, directly or indirectly, by an Organizer module 60, which includes two major sub-modules—Rate Analyzer 64 and Rate Equalizer 62. Some control is exerted also by a Scheduler module 50. The Organizer is aware of schedule times of all scripts through the Scheduler and information path 57.

Generally speaking, Organizer module 60, which contains the main intelligence of the Process module, keeps track of the data flow of each program and adjusts it to, on the one hand, conform as well as possible with the schedule specified in the respective script and, on the other hand, proceed at such a pace, and in such a sequence with respect to the data of the other programs within the combined stream, that all required image data (e.g. frames) eventually reach any decoder within an allowed maximum delay (such as VBV Delay in MPEG standards). For this purpose the Organizer, more specifically—controls Encoder 54, in a closed loop fashion explained further below, to use suitable compression parameters and/or alter the selection of key frames (e.g. MPEG I-frames) and/or shift some data from key frames to other frames;—controls Multiplexer 56 in selecting a next segment of data (and its length) from among the various program streams stored in Encoded streams Storage 44, to be added to the combined stream; and—occasionally controls Renderer 52, through Scheduler 50 to select a segment of script to be rendered next. To the latter end, Scheduler 50 is commanded to retrieve from Scripts Storage 18, via path 41, information about pending program material scheduled to be broadcast during any target future time period.

Figure 4:
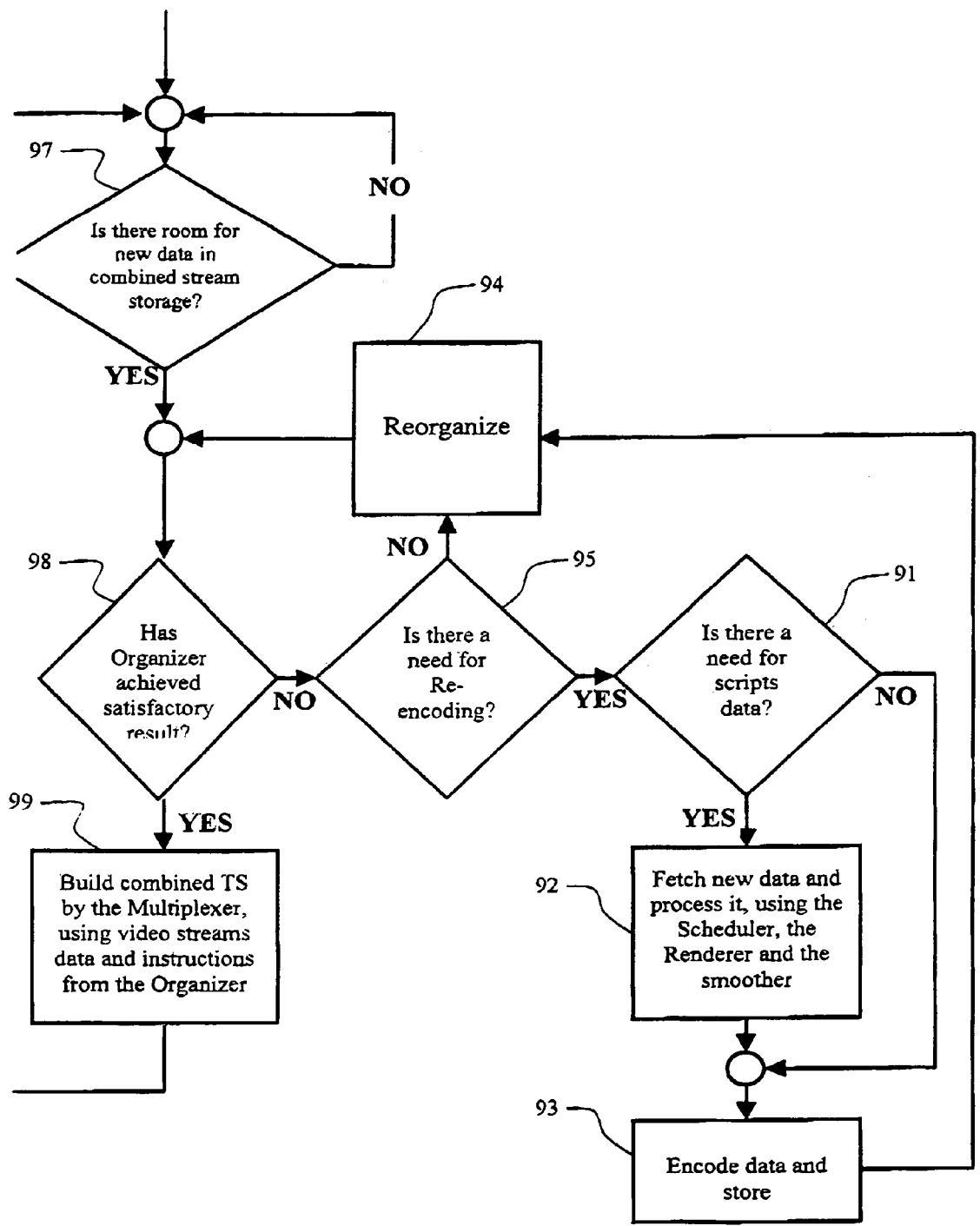
FIG. 4 is a flow chart, showing the sequence of operations in the process module of FIG. 3.

Typical operation of the Process module will now be followed, with reference to the block diagram of FIG. 3 and the flow chart of FIG. 4 (whose steps will be indicated by reference numeral in parentheses). Didactically, one can distinguish between two major inter-related sequences—one pseudo-synchronous sequence, associated with the generation and flow of the combined data stream, and an asynchronous sequence, associated with the processing of images in preparation for multiplexing. The first sequence will now be described, starting with the need to feed the synchronous DVB transport stream. TS data are retrieved from DVB-TS buffer 48 at a regular pace determined by the head-end clock. VIC-Server clock 59 sends pulses to Re-formatter 58, each pulse causing it (subject to availability of space in buffer 48) to retrieve a segment from Combined stream buffer 46, to re-format it and to enter it into DVB-TS buffer 48. Resultant availability of space in Combined stream buffer 46 (step 97) causes Multiplexer 56 to fetch (step 99) a new data segment from Data Streams Storage 44, under control of Organizer 60, and to add it to the combined data stream in pipeline buffer 46, thus filling the detected vacancy there. This operation is conditional (step 98) on there being a proper instruction available from the Organizer. Such an instruction is the result of a so-called re-organizing operation (step 94) which is a calculation continuously performed by the Organizer, on information 43 obtained from pending data of all programs in Encoded streams Storage 44, in an attempt to fit them within the combined stream under the constraints outlined above. The re-organizing operation is part of the second logical sequence, mentioned above, which will be described next.

We begin by testing (step 91) whether there are enough data stored in Raster Storage 42; if not (step 92), Scheduler 50 chooses, under instructions from Organizer 60, an appropriate script portion of a certain program and commands Renderer 52 to retrieve it, then to render it and possibly pass the resulting raster image through Smoother 53, before inputting it to Raster Storage 42.

Next (step 93), Organizer 60 commands Encoder 54 to encode the resultant raster image, or any data stored in Raster images storage 42, and to store the code in Encoded Streams Storage 44. Now Rate Analyzer 64 obtains information about the newly stored segment of code and determines whether, according to current merge scheme, it is within the bounds of the aforementioned constraints on combined data flow. If not, a re-organization calculation (step 94) takes place, which means that a different scheme for merging data segments in the multiplexer is considered and its consequences for the expected delay of each data segment of each program re-calculated. This operation continues in a loop fashion (steps 98 and 95) until successful, whereupon (step 99) Multiplexer 56 is allowed to continue operation according to the first (pseudo-synchronous) sequence described above. If the re-organization calculation fails to achieve a satisfactory data sequence (step 95), it instructs Rate Equalizer 62 to cause Encoder 54 to re-encode that segment, using different parameters. This loop may be repeated, but if no sufficiently compact code is achieved, while keeping required image quality (step 91), Scheduler 50 may be requested (step 92) to fetch a different segment, possibly of another program, to undergo the rendering and encoding process and be inserted in the position currently being calculated.

All modules within the Process module are preferably embodied as software modules in a general-purpose computer, except that the storage modules may involve hardware storage components. Likewise, modules within the Input module are preferably embodied as software modules, except that the communication module may include hardware components of conventional design. As with any dedicated software process, some of the operations may be accelerated, if necessary, by use of high-powered processing hardware, such as DSPs, parallel processors and special-purpose processors (e.g. ASPs). The Process module as a whole may also be embodied as an integrated software package, which may also include the software functions of the In-, Out- and Control modules. It will also be understood that the method and the apparatus according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

The invention claimed is:

1. A method for concurrently transmitting a plurality of informational programs over a single digital transport stream to at least one receiver; the transport stream has a given rate of transmission and each receiver is operative to decode the transport stream into displayable video images corresponding to a selected program, the video images being structured as periodic frames, there being defined a delay period as the maximal period of time over which data in the transport stream decodable into any one complete frame, for any selectable program, must arrive; the method comprises processing that includes the steps of:
   i) scheduling a plurality of informational programs to be transmitted concurrently;
   ii) rendering, compressing and encoding each of the scheduled programs to obtain a corresponding digital video stream;
   iii) multiplexing all of said digital video streams, to form a first transport stream;
   each step being controlled interdependently among the informational programs;
   wherein said special processing is such that the video images corresponding to any selected informational video program that are displayable by any of said receivers when decoding said first transport stream are of essentially similar appearance to images displayable by the receiver if decoding a second transport stream, formed by otherwise processing said selected informational video program alone; and
   wherein if the plurality of informational programs were otherwise scheduled, rendered, compressed and encoded so that the resulting data be decodable by any receiver into corresponding video images of acceptable quality, there could be a number of instances in each of which the sum total of said resulting data that is required for decoding into one complete frame of displayable video image for each of said otherwise scheduled programs would substantially exceed the amount of data transmittable as a transport stream at the given rate of transmission over one delay period.

2. A method for concurrently transmitting a plurality of informational programs over a single digital transport stream to at least one receiver; the transport stream has a given rate of transmission and each receiver is operative to decode the transport stream into displayable video images corresponding to a selected program; the method comprises special processing that includes the steps of:
   i) scheduling a plurality of informational programs to be transmitted concurrently;
   ii) rendering, compressing and encoding each of the scheduled programs to obtain a corresponding digital video stream;
   iii) multiplexing all of said digital video streams, to form a first transport stream;
   each step being controlled interdependently among the informational programs;
   wherein said special processing is such that the video images corresponding to any selected informational video program that are displayable by any of said receivers when decoding said first transport stream are of essentially similar appearance to images displayable by the receiver if decoding a second transport stream, formed by otherwise processing said selected informational video program alone; and
   wherein if the plurality of informational programs were otherwise processed to be concurrently transmitted over a second transport stream at the given rate of transmission, video images, corresponding to some of the informational programs and displayed by any of the receivers if decoding said second transport stream, would have some noticeable distortions or would have inferior quality with respect to said images displayable when decoding said first transport stream.

3. A method for concurrently transmitting a plurality of informational programs over a single digital transport stream to at least one receiver; the transport stream has a given rate of transmission and each receiver is operative to decode data in the transport stream, which are identified with a selected program, into corresponding displayable video images, structured as periodic frames, there being defined a delay period as the maximal period of time over which data in the transport stream decodable into any one complete frame, for any selectable program, must arrive; the method comprises special processing that includes the steps of:
   i) scheduling a plurality of informational programs to be transmitted concurrently;
   ii) rendering, compressing and encoding each of the scheduled programs to obtain a corresponding digital video stream;
   iii) multiplexing all of said digital video streams, to form a first transport stream, while identifying data with their respective informational programs;
   each step being controlled interdependently among the informational programs;
   wherein if the plurality of informational programs were scheduled, rendered, compressed and encoded, without being controlled interdependently among the informational programs, so that the resulting data be decodable by any receiver into corresponding video images of acceptable quality, there could be a number of instances in each of which the sum total of said resulting data that is required for decoding into one complete frame of video image for each of said plurality of programs, would substantially exceed the amount of data transmittable as a transport stream at the given rate of transmission over one delay period; and
   wherein said special processing is such that video images, displayable by any of the receivers when decoding from said first transport stream data that are identified with any selected informational video program, are of essentially similar appearance to those of said video program, are of essentially similar appearance to those of said video images of acceptable quality that correspond to the selected informational program.

4. A method for concurrently transmitting a plurality of informational programs over a single digital transport stream to at least one receiver; the transport stream has a given rate of transmission and each receiver is operative to decode data in the transport stream, which are identified with a selected program, into corresponding displayable video images; the method comprises special processing that includes the steps of:
  i) scheduling a plurality of informational programs to be transmitted concurrently;
  ii) rendering, compressing and encoding each of the scheduled programs to obtain a corresponding digital video stream;
  iii) multiplexing all of said digital video streams, to form a first transport stream, while identifying data with their respective informational programs;
    each step being controlled interdependently among the informational programs;
    wherein said processing is such that video images, obtained by any of the receivers decoding from said first transport stream data that are identified with any selected informational video program, are of acceptable quality; and
    wherein if the plurality of informational programs were processed, without being controlled interdependently among the informational programs, to be concurrently transmitted over a second transport stream at the given rate of transmission, there could be video images, displayed by any of the receivers when decoding data from said second transport stream, whose quality is inferior to said acceptable quality or which have noticeable distortion.

5. A method for concurrently transmitting a plurality of informational programs over a single digital transport stream to at least one receiver; the transport stream has a given rate of transmission and each receiver
  is operative to decode data in the transport stream, which are identified with a selected program, into corresponding displayable video images, structured as periodic frames, there being defined a delay period as the maximal period of time over which data in the transport stream decodable into any one complete frame, for any selectable program, must arrive; the method comprises processing that includes the steps of:
  i) scheduling a plurality of informational programs to be transmitted concurrently;
  ii) rendering, compressing and encoding each of the scheduled programs to obtain a corresponding digital video stream;
  iii) multiplexing all of said digital video streams, to form a first transport stream, while identifying data with their respective informational programs;
    each step being controlled interdependently among the informational programs;
  wherein said processing is such that video images, obtainable by decoding any of said digital video streams are of acceptable quality and so that data required for decoding into any one frame of displayable video image for each of the scheduled programs occur in said first transport stream within one delay period; and
  wherein if the plurality of informational programs were scheduled, rendered, compressed and encoded, without being controlled interdependently among the informational programs, so that the resulting data be decodable by any receiver into corresponding video images of acceptable quality, there could be a number of instances in each of which the sum total of said resulting data required for decoding into one complete frame of video image for each of said plurality of programs, would substantially exceed the amount of data transmittable as a transport stream at the given rate of transmission over one delay period.

6. A method for concurrently transmitting a plurality of informational programs over a single digital transport stream to at least one receiver; the transport stream has a given rate of transmission and each receiver is operative to decode data in the transport stream, which are identified with a selected program, into corresponding displayable video images, structured as periodic frames, there being defined a delay period as the maximal period of time over which data in the transport stream decodable into any one complete frame, for any selectable program, must arrive; the method comprises special processing that includes the steps of:
  i) scheduling a plurality of informational programs to be transmitted concurrently;
  ii) rendering, compressing and encoding each of the scheduled programs to obtain a corresponding digital video stream;
  iii) multiplexing all of said digital video streams, to form a first transport stream, while identifying data with their respective informational programs;
    each step being controlled interdependently among the informational programs;
    wherein said processing is such that video images, obtainable by decoding any of said digital video streams are of acceptable quality and so that data required for decoding into any one frame of displayable video image for each of the scheduled programs occur in said first transport stream within one delay period; and
    wherein if the plurality of informational programs were processed, without being controlled interdependently among the informational programs, to be concurrently transmitted over a second transport stream at the given rate of transmission, there could be video images, displayed by any of the receivers when decoding data from said second transport stream, whose quality is inferior to said acceptable quality or which have noticeable distortions.

7. A method for concurrently transmitting a plurality of informational programs over a single digital transport stream; each program is obtained from a source as a script, including image- and timing data, the image data structured as one or more image elements; the method comprises:
  i) scheduling a plurality of informational programs to be transmitted concurrently;
  ii) rendering each of said scheduled programs, resulting in corresponding raster-based frame-by-frame image representation;
  iii) compressing and encoding said raster-based representation of each of said scheduled programs, to obtain a corresponding digital video stream, in which data of successive frames are grouped so that one frame in each group, being a key frame, is independently encoded and other frames in that group are encoded in dependency on the key frame;
  iv) dividing each of said video streams into segments, interleaving segments from all of said video streams and formatting the resultant interleaved data, to form the transport stream;
  v) controlling said operations of scheduling, rendering, compressing, encoding and multiplexing so as to include two or more of the group of—
  in performing said scheduling, causing the scheduling of any image element in any of the programs to deviate from the respective timing data, so that image elements resulting in large amounts of data in their respective digital video streams become staggered among said video streams;

in performing said encoding, varying the lengths of said groups of frames corresponding to any one or more programs so as to stagger the timing of key frames among the several video streams;

in performing said interleaving, determining the length of each data segment;

in performing said interleaving, determining the sequence in which data segment from the various video streams are to be interleaved;

wherein said controlling with respect to data corresponding to any one program depends on data corresponding to at least one other program.

8. The method of claim 7, wherein the image elements in any script may be obtained in any of a plurality of codes and raster formats.

9. The method of claim 7, further including modifying any results of said rendering so as to reduce the amount of data in the respective video stream.

10. The method of claim 7, wherein said controlling additionally includes any of— in performing said compressing and encoding, determining compression parameters for any programs so as to control the amount of data in any portion of the respective video stream;

in performing said encoding with respect to any video stream, moving some data between frames of any one group.

11. The method of claim 7, wherein said controlling additionally includes repeating step (i) with respect to any of the scheduled informational programs, with changed timing of image elements.

12. The method of claim 7, wherein said controlling additionally includes repeating any of steps (ii) and (iii) with respect to any of said scheduled programs, with changed parameters.

13. The method of claim 7, wherein said controlling is such that all the data of any one frame, corresponding to any of the scheduled programs, is transmitted in the transport stream within a given maximum period.

14. The method of claim 7, wherein in step (v) said two or more of the group is three or more of the group.

15. The method of claim 7, wherein in step (v) said two or more of the group is all of the group.

16. The method of claim 7, wherein said encoding is according to any MPEG standard and said key frames are I frames.

17. The method of claim 7, wherein the transport stream, being an informational transport stream, is carried by a digital video transmission (DVT) system along with a plurality of other transport streams.

18. The method of claim 17, wherein data transmitted through the DVT is structured by data units, each data unit being identifiable with a selectable program and wherein in step (iv) said formatting includes causing data units, transmitted in the informational transport stream, to be thus identifiable with any corresponding informational program.

19. The method of claim 17, wherein there are specified for the DVT certain standard transmission rates for each transport stream and wherein the transmission rate of the informational transport steam is one of said standard rates.

20. A method for concurrently transmitting a plurality of informational programs over a single digital transport stream to at least one receiver; each program is obtained from a source as a script, including image- and timing data, the image data structured as one or more image elements; the transport stream has a given rate of transmission and each receiver is operative to decode the transport stream into displayable video images corresponding to a selected program, the video images being structured as periodic frames; the method comprises special processing that includes the steps of:

i) scheduling a plurality of informational programs to be transmitted concurrently;

ii) rendering, compressing and encoding each of the scheduled programs to obtain a corresponding digital video stream, in which data of successive frames are grouped so that one frame in each group, being a key frame, is independently encoded and other frames in that group are encoded in dependency on the key frame;

iii) multiplexing all of said digital video streams, whereby each video stream is divided into segments and segments from all the video streams are interleaved, to form a first transport stream;

iv) controlling said operations of scheduling, rendering, compressing, encoding and multiplexing so as to include two or more of the group of— in performing said scheduling, causing the scheduling of any image element in any of the programs to deviate from the respective timing data, so that image elements resulting in large amounts of data in their respective digital video streams become staggered among said video streams;

in performing said encoding, varying the lengths of said groups of frames corresponding to one or more programs so as to stagger the timing of key frames among the several video streams;

in performing said multiplexing, determining the length of each data segment;

in performing said multiplexing, determining the sequence in which data segment from the various video streams are to be interleaved;

wherein said controlling with respect to data corresponding to any one program depends on data corresponding to at least one other program.

21. Apparatus connectable to a digital video transmission (DVT) system for feeding thereto an informational transport stream at any given transmission rate, the transport stream including data that carry a plurality of informational video programs; each program is obtained from a source as a script, including image- and timing data, the image data structured as one or more image elements; the apparatus comprises:

a scheduler for scheduling a plurality of informational programs to be transmitted concurrently;

a renderer for rendering each of the scheduled programs to obtain a corresponding raster-based frame-by-frame image representation;

an encoder for compressing and encoding said image representation of each of the scheduled programs into a corresponding digital video stream, in which data of successive frames are grouped so that one frame in each group, being a key frame, is independently encoded and other frames in that group are encoded in dependency on the key frame;

a multiplexer for dividing each of said video streams into segments and for interleaving segments from all of said digital video streams and formatting them into the transport stream; and an organizer operative to control the operation of said scheduler, said renderer, said encoder and said multiplexer in any of the following ways— causing said scheduler to deviate in the scheduling of any image element in any of the programs from the respective timing data, so that image elements resulting in large amounts of data in their respective digital video streams become staggered among said video streams;

for said encoding by said encoder, varying the lengths of said groups of frames corresponding to one or more of the programs so as to stagger the timing of key frames among the several video streams;

for said interleaving by said multiplexer, determining the length of each data segment;

determining the sequence in which data segment from the various video streams are interleaved;

wherein said controlling with respect to data corresponding to any one program depends on data corresponding to at least one other program.

22. The method of claim 21, wherein the image elements in any script may be obtained in any of a plurality of codes and raster formats.

23. The method of claim 21, further including a smoother for modifying any results of said rendering so as to reduce the amount of data in the respective video stream.

24. The method of claim 21, wherein said organizer is further operative to control the operation of said scheduler, said renderer, said encoder and said multiplexer in any of the following ways— in performing said compressing and encoding, determining compression parameters for any program so as to control the amount of data in any portion of the respective video stream;

in performing said encoding with respect to any video stream, moving some data between frames of any one group.

25. The method of claim 21, wherein said controlling additionally includes repeating step (i) with respect to any of the scheduled informational programs, with changed timing of image elements.

26. The method of claim 21, wherein said organizer is further operative to cause repeating any of steps (ii) and (iii) with respect to any of said scheduled programs, with changed parameters.

27. The method of claim 21, wherein said controlling by said organizer is such that all the data of any one frame, corresponding to any of the scheduled programs, is transmitted in the transport stream within a given maximum period.

28. The method of claim 21, wherein said encoding is according to any MPEG standard and said key frames are I frames.

29. The method of claim 21, wherein the video transmission system also carries a plurality of other transport streams.

30. The method of claim 29, wherein data transmitted through the DVT is structured by data units, each data unit being identifiable with a selectable program and wherein said formatting by said multiplexer includes causing data units, formatted into the informational transport stream, to be thus identifiable with any corresponding informational program.

31. The method of claim 29, wherein there are specified for the DVT certain standard transmission rates for each transport stream and wherein the transmission rate of the informational transport stream is one of said standard rates.

32. A digital video transmission system including the apparatus of claim 21.

33. A component of a digital video transmission system including the apparatus of claim 21.

34. In a digital video transmission (DYT) system operative to transmit one or more digital transport streams to at least one receiver, which is operative to obtain, from any transport stream, data identified with any selected program and to decode the obtained data into corresponding displayable video images—an informational transport stream, having a given rate of transmission and which may be multiplexed with any other transport streams; the informational transport stream comprises data packets each packet identified with any of a plurality of informational programs, which are supplied to the DVT system; said data packets identified with any one informational program carry video image code, structured as groups of frames, the number of frames in each group being variable, and the number of consecutive packets identified with any one program being variable, wherein all of the data packets for any one frame, identified with any of the informational programs, are transmitted within a given maximum period; the video images displayable by any of the receivers when decoding data packets identified with any of the informational programs are of acceptable quality, and wherein if said plurality of informational programs were encoded into a transport stream of said given rate of transmission, as equal runs of consecutive packets identified with any one program, the code structured as equal groups of frames, the quality of video images displayable by any of the receivers when decoding data packets identified with any of the informational programs would be appreciably inferior to said acceptable quality.

* * * * *